United States Patent Office 2,780,520
Patented Feb. 5, 1957

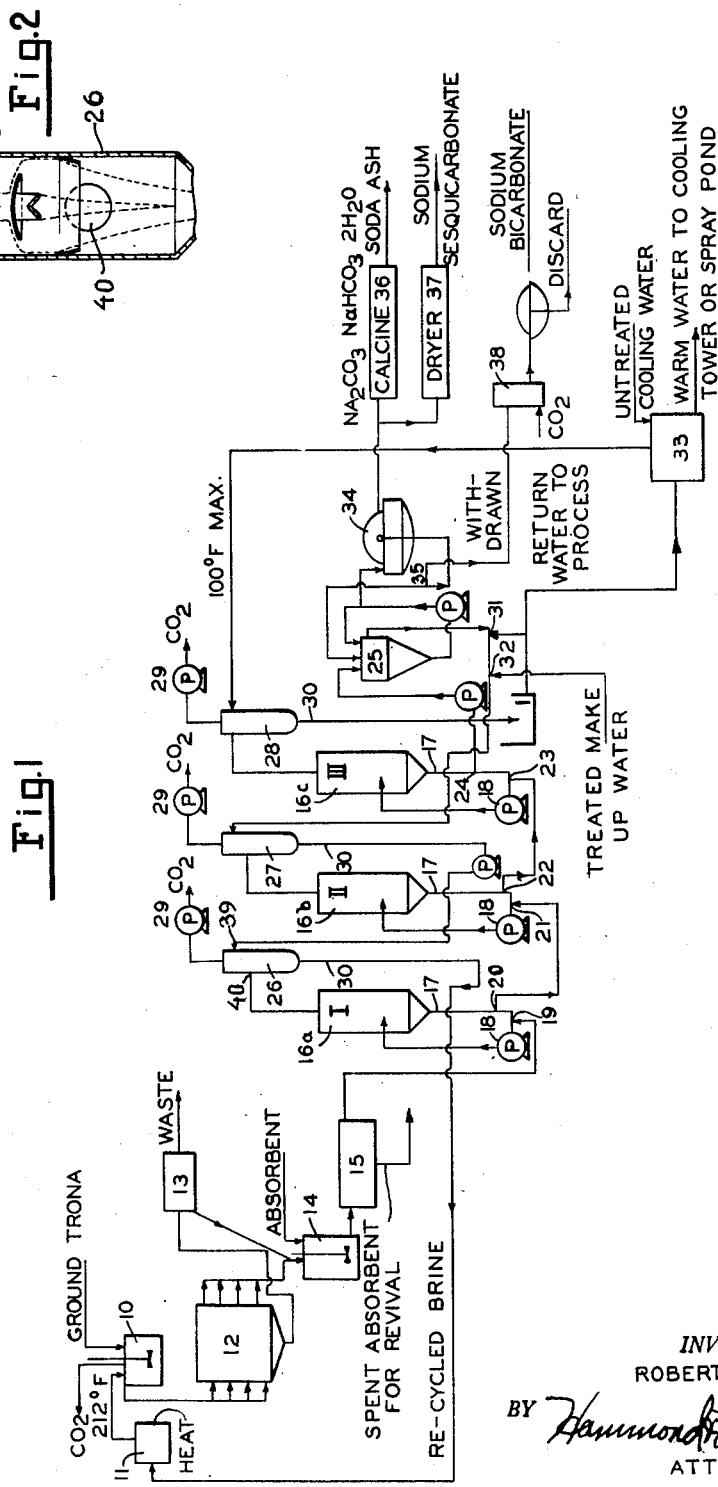

2,780,520

CARBONATION OF RECYCLE LIQUOR IN SODIUM SESQUICARBONATE PRODUCTION

Robert D. Pike, Greenwich, Conn.; Kenneth B. Ray and The Stamford Trust Company, executors of said Robert D. Pike, deceased Application May 4, 1953, Serial No. 352,955

7 Claims. (Cl. 23—63)

This invention is an improvement on the process described in my United States Patent No. 2,346,140, issued April 11, 1944, and is a continuation-in-part of application Serial No. 107,529, filed January 29, 1949, now Patent No. 2,639,217. My earlier invention relates to the production of pure sodium carbonate, specifically, sodium sesquicarbonate and soda ash, from Wyoming trona, or similar materials. As described in said earlier patent, use is made of a recycling brine made up principally of a solution of sodium carbonate and bicarbonate in water, the former greatly predominating in concentration. This brine is heated to at least about 185° F. and used to dissolve the raw trona. The hot solution is clarified to remove shale, and is then subjected to treatment by an absorbent material, such as activated carbon, to remove organic and coloring matter. This matter imparts a yellowish color to the solution of trona, which is entirely removed by the use of a very small amount of activated carbon. The carbon is then removed by filtration and the water-white solution cooled, thereby crystallizing out sodium sesquicarbonate of high purity and dead-white color. In said earlier patent, I have illustrated the use of eight stages of vacuum crystallizers, cooling the salt solution from about 185° F. to about 86° F. I also protected the recycled brine against the loss of $CO_2$ by operating in closed vessels and providing an atmosphere of $CO_2$.

In application Serial No. 107,529, now Patent No. 2,639,217, I have disclosed that by modifying the process described in my prior patent to provide for the solution and crystallization of salt over a temperature range of about 212° F. to 140° F., and using open tanks for dissolving and taking no precautions to prevent loss of $CO_2$, a substantial improvement in operation can be realized. A certain loss of $CO_2$ occurs in the process of said copending application due to decomposition of some of the sodium bicarbonate component of the recycling brine, but this is more than compensated for by other economies and advantages of the process described in said application.

In said application I have also disclosed that by bleeding or removing a certain percentage of the recycling brine in addition to that which is removed with the recovered crystals, it is possible to keep its concentrations of NaCl and $Na_2SO_4$, which are introduced with the trona and which tend to build up in the recycled brine, low enough so that the sodium sesquicarbonate crystals can be dried or calcined without washing, while producing a product of high purity.

I have also disclosed in said application that I may maintain the composition of the recycling mother liquor substantially constant and within the ratio of $Na_2CO_3$ to $NaHCO_3$ which will dissolve trona congruently and crystallize out sodium sesquicarbonate by discarding from the recirculating system that amount of the mother liquor which is necessary to compensate for the $CO_2$ lost and maintain the proper normal carbonate to bicarbonate ratio in the recirculating mother liquor. This discarded mother liquor may be that normally lost by leakage or spillage from the circulating system; that adhering to the crystals which are preferably not washed, but if washed, only to a limited extent; or may be a portion which is discarded to maintain the desired concentration of the mother liquor in contact with which sodium sesquicarbonate is the stable solid crystal phase, and which is yielded in substantial quantity upon cooling the hot mother liquor from the dissolvers from about 212° F. to about 140° F.

I have found that by contacting the recirculated mother liquor with the $CO_2$ which is released in the evaporators sufficient of the $CO_2$ may be recovered and sufficient of the $Na_2CO_3$ recarbonated to $NaHCO_3$ that the amount of mother liquor required to be discarded may be materially reduced.

While the contacting of the mother liquor with the $CO_2$ released in the process may be carried out in various ways, an efficient and economical way of recovering a part of the released $CO_2$ is by direct liquid-gas contact of the cooled recirculating mother liquor with the escaping $CO_2$ in direct contact spray condensers used in connection with the crystallizers, as described in my said copending application.

I may, if desired, also treat the bled or withdrawn or discarded portion of the recycling mother liquor for recovery of its carbonate values, notably, by carbonation with $CO_2$ containing gas in a well known manner, to precipitate most of the $Na_2O$ present as relatively insoluble sodium bicarbonate, which is readily marketable, although treatment to recover the carbonate values of the bled off portion is not necessary for the economical use of the process herein described.

It is, therefore, the object of my invention to provide an improved process for the recovery of sodium carbonate or sodium sesquicarbonate from naturally occurring trona which will be more economical and less difficult to use than that described in my prior patent.

Another object of my invention is to provide a process for recovering sodium carbonate or sodium sesquicarbonate from trona which can be operated at higher temperatures than those described in my said prior Patent No. 2,346,140 without undue precautions against the loss of $CO_2$ from the circulating brine or without provisions for the addition of $CO_2$ from outside sources to the circulating brine.

Another object of my invention is to provide a method for the recovery of a part of the $CO_2$ lost from the trona solution in the crystallizers, which comprises contacting the escaping $CO_2$ with recirculating cooled mother liquor so that a portion of the $CO_2$ is reabsorbed and a portion of the recirculated mother liquor is recarbonated to $NaHCO_3$ to thereby partially restore the required $Na_2CO_3$ to $NaHCO_2$ ratio in the mother liquor.

Various other objects and advantages of my invention will appear as this description proceeds.

While the mol ratio of $Na_2CO_3$ to $NaHCO_3$ over which my process is workable depends in part upon the temperature of solution and crystallization and the amount of dissolved impurities in the circulating mother liquor, in general this mol ratio should be maintained between the limits of about 1.7 mols $Na_2CO_3$ to 1 mol $NaHCO_3$ and 5.8 mols $Na_2CO_3$ to 1 mol $NaHCO_3$ in the hot mother liquor entering the crystallizing step at about 212° F. In the cooled mother liquor leaving the crystallizers at about 140° F., the mol ratio corresponding to 1.7 mols $Na_2CO_3$ to 1 mol $NaHCO_3$ and 5.8 mols $Na_2CO_3$ to 1 mol $NaHCO_3$ varies from about 2.1 mols $Na_2CO_3$ to 1 mol $NaHCO_3$ to about 12.6 mols $Na_2CO_3$ to 1 mol $NaHCO_3$. Outside of the range of these mol ratios, the yields of sodium sesquicarbonate become so small as to be negligible and other compounds than the sesquicarbonate begin to crystallize out. Therefore, when, due to the loss of $CO_2$ from the circulating liquor in the dissolving, clarifying and crystallizing steps, the mol ratio of $Na_2CO_3$ to $NaHCO_3$ in the mother liquor falls materially outside of the ranges given above, it is economically desirable to correct the composition of the mother liquor by bleeding or discarding sufficient of the mother liquor that the amount of $NaHCO_3$ added in dissolving trona will maintain the desired balance. However, it is one of the objects of my invention to choose a desirable composition of the mother liquor at the start and to maintain this composition in as steady a state as possible and in the manner hereinafter specified for the carrying out of my process.

Referring now to the drawings, Fig. 1 illustrates a diagrammatic outline of the process, and Fig. 2 is a part sectional view on a larger scale diagrammatically illustrating one form of direct contact spray condensers which may be used in connection with the crystallizer.

In the drawings, 10 represents an agitating vessel for dissolving ground trona in recycled brine which has been heated in 11 to about 212° F. I preferably grind the trona so that all will pass a 20 mesh screen. Two or three dissolving vessels may be used in series so as to make a substantially saturated solution, or this may be done by dissolving in batches in a well known manner, as may be preferred. The saturated solution then goes to 12, which is preferably a four-tray parallel feed thickener, insulated heavily against the loss of heat. The thickened underflow of this thickener passes to a centrifuge 13, or other well known suitable dewatering device, in which shale and other insoluble material found in natural trona is removed. The brine removed in 13 joins the clarified overflow from 12 and the insoluble residue is discarded to waste. I may employ all or a part of the makeup water referred to later, to wash the insoluble material in 13 free of brine, and return this wash to the main stream of makeup water.

The combined streams of recycled brine from 12 and 13 go to an agitating treating tank 14 where the brine is retained about half an hour in agitated contact with activated adsorbent carbon, in amount corresponding to about .3% of the trona introduced. This treatment also may be done either in continuous flow or batches. This treatment removes organic and coloring matter and after the recycled brine is filtered in 15, a water-white solution results which is quite free from iron and will not foam in the vacuum crystallizers. The spent adsorbent removed from filter 15 may be discarded or revived for reuse.

The clarified hot saturated brine now enters the first effect of a series of vacuum crystallizers, 16a, b and c. I prefer to employ three crystallizers in series, which is the number shown in the drawings. However, the number of crystallizer effects is dictated by considerations of economy and I may carry out my process, if desired, with the use of a single effect. Up to this point no precautions have been taken to prevent the loss of $CO_2$ from the hot trona solution in vessels 10, 12, 14, etc.

In the crystallizers 16a, 16b and 16c a separate recirculation of brine is preferably maintained through each effect by withdrawing a slurry of brine and crystals through a barometric leg 17 from the bottom of each effect, and pumping it back by pumps 18 into the main bodies of the effects. The circulating brine from 15 enters the recirculation of the first effect at 19 and leaves at 20, entering the recirculation of the second effect at 21 and leaving at 22, entering the recirculation of the third effect at 23 and leaving at 24, whence it is pumped into crystal settler 25.

The amount of recirculation just referred to in each effect may be controlled by the operator within limits, and this in turn controls the so-called flash range of the vacuum crystallizers. The flash range is the difference in temperature between that prevailing in the crystallizer and that of the mixture of the recirculating feed, and the net feed to each crystallizer. For example, according to one set of operating conditions, the feed entering the first effect at 19 is at a temperature of about 212° F., leaving at 188° F., showing a temperature drop of 24°. The feed entering the second effect is at 188° F., and leaving is at 164° F., likewise showing a drop in the effect of 24°. The feed entering the third effect is at 164° F., leaving at 140° F., likewise showing a drop of 24°. Therefore, when operated according to these conditions, there is a net temperature drop of 24° in each of the three effects of the crystallizers. A flash range in each crystallizer effect may be chosen over a wide range from, say 1° F. to 7° F. For the purpose of this description it will be assumed that the flash range is 4° F. This is just 1/6 of the total temperature drop so, in this example, the recirculation pulse the net feed entering the crystallizer must be six times as great as the net feed itself. This means that the recirculation must be five times the net circulation through each effect.

In this example, the pressure in the third effect is maintained at about 5" Hg absolute, about 10" Hg absolute in the second effect, and about 19" Hg absolute in the first effect.

It is to be understood, however, that different sets of operating conditions may be chosen and maintained and that a greater or lesser number of crystallizer effects may be used.

In each of the crystallizers 16a, 16b and 16c, some $CO_2$ will be flashed off from the brine which, for example, enters the recirculation of crystallizer 16a at a temperature of about 212° F. and is subjected to the vacuum prevailing in this crystallizer. A portion of the $CO_2$ which flashes off in the crystallizers 16a and 16b is recovered by contacting the escaping $CO_2$ with cooled recirculating mother liquor in the jet condensers 26 and 27 in which, as illustrated diagrammatically in Fig. 2, the steam and $CO_2$ enters at 40, the recirculating mother liquor enters at 39 and the gases flow counter-current through the sheets of mother liquor (indicated in dotted lines) to the outlet leading to vacuum pumps 29.

As described in my copending application, now Patent No. 2,639,217, the separate effects are each provided with jet condensers 26, 27 and 28. Each condenser is provided with a top connection to a vacuum pump 29 for removing unabsorbed $CO_2$, and any other non-condensable gases, and each is provided with a barometric leg 30. Condenser 28, which is connected to the third, or last, effect of the series of crystallizers, is preferably supplied with a spray of pure water at a maximum temperature of about 100° F. The water which is evaporated in this effect under the influence of the vacuum, is condensed and returned to the circulation at 31 at a temperature of about 125° F. Cold pure makeup water, some of which may have been used as a wash in 13, is introduced at 32. I find it preferable to introduce the water in the region of 31 and 32 because this immediately removes the saturation of the recirculating brine and cools the brine to some extent, and from that point in its flow until it again reaches vessel 10, it is unsaturated and cannot, therefore, deposit crystals in the pipe lines. The balance of the water introduced into condenser 28, amounting to about 950 G. P. M. is cooled in tubular cooler 33, on the outside of the piping of which flows cold untreated water from a spray pond, or tower, not shown. In this way the treated water which is evaporated in the third effect is saved and returned to the system. Whereas, if the condenser 28 had been provided with untreated water, the pure water would have been contaminated by untreated water.

I have pointed out that the net circulation from the third effect 16c is withdrawn at 24 and pumped to settler 25. The underflow from 25 is a thickened slurry of crystals of sodium sesquicarbonate, which is dewatered in a vacuum filter or centrifuge 34. I prefer not to wash these crystals when using my process to treat the Green River, Wyoming trona, or at most to wash them only partially, because the content of NaCl, Na₂SO₄ and other soluble salts in this trona is so low that withdrawing a very small part of the circulating brine at 35, as shown, together with the brine remaining with the crystals from 34, I keep the concentration of NaCl and Na₂SO₄ in the recycling brine at so low a level that the amount of these materials added to the sodium sequicarbonate crystals by the adhering brine is within permissible limits to allow this product to be classed as chemically pure. In order to accomplish this end, however, I find it desirable to treat the water of the Green River region, which is used for makeup, by ion exchange or other suitable treatment in order to remove Na₂SO₄ and NaCl from it before it is used in the process.

It should be understood that spillage and other losses of the recirculating brine in a process of this type, notably with the unwashed or only partially washed crystals of sodium sesquicarbonate, may be such that a constant withdrawal at 35 is not required, and that if the concentration of NaCl and Na₂SO₄ builds up in the circulation, and if due to a too great loss of CO₂ the composition of the recirculating mother liquor changes to the point where trona is no longer congruently soluble and sodium sesquicarbonate is not the only solid crystal phase, sufficient of the recirculating brine may be withdrawn at 35 to keep the recirculation in the required balance. Although this withdrawal may be done periodically, it is better to establish it continuously so as to maintain the recirculation in the steady state of desired concentration.

The product of my process, which is substantially pure sodium sesquicarbonate, Na₂CO₃·NaHCO₃·2H₂O, may be calcined in any suitable device 36, to make soda ash of high purity or may be dried in drier 37 to produce highly pure crystals of sodium sesquicarbonate. The brine withdrawn at 35 may be treated with CO₂ in 38 to recover most of its Na₂O as sodium bicarbonate. However, the amount of the latter thus recovered, is relatively small and I may, if I prefer, discard the withdrawn brine without serious economic loss.

The overflow from the settler 25 is at a temperature of about 140° F. This temperature is lowered and the brine is somewhat diluted by the addition of makeup and recovered water at 31 and 32, as disclosed above. This brine is then used as the condensing spray in barometric condenser 27 which serves the second effect. This somewhat further dilutes and heats the brine which is then used as the condensing spray in 26. The brine leaving 26 through the barometric leg 30 may be heated as high as 165° F., and is the recycled mother liquor which goes to heater 11 preparatory for reuse for dissolving trona in 10.

The cooled recycling mother liquor containing dissolved Na₂CO₃ and NaHCO₃ is directly contacted with the CO₂ gases escaping from the crystallizers 16a and 16b in the condensing sprays in condensers 27 and 26, and thereby absorbs a portion of the CO₂ and is partially recarbonated by the reaction.

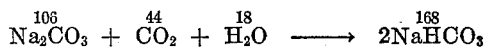
$$\underset{106}{Na_2CO_3} + \underset{44}{CO_2} + \underset{18}{H_2O} \longrightarrow \underset{168}{2NaHCO_3}$$

thus reducing the Na₂CO₃ content and increasing the NaHCO₃ of the mother liquor so as to partially compensate for the loss of CO₂ in the process and partially restore the desired Na₂CO₃, NaHCO₃ ratio in the mother liquor.

As shown in Fig. 1 of my earlier patent, No. 2,346,140, this recycled mother liquor, in order to dissolve trona congruently and to crystallize sodium sesquicarbonate from the solution by cooling to 30° C. (86° F.), may have a composition of about 23.5 gms. Na₂CO₃ and 5 gms. NaHCO₃ per 100 gms. H₂O, corresponding to a ratio of 3.7 mols Na₂CO₃ to 1 mol NaHCO₃; and by interpolation at 140° F., about 28 gms. Na₂CO₃ and 8.5 gms. NaHCO₃ per 100 gms. H₂O, in turn corresponding to a ratio of 2.6 mols Na₂CO₃ to 1 mol NaHCO₃. In the calculations which follow, pertaining to the example of the present application, the composition of the motor liquor used to dissolve the trona is given as 28.4 gms. Na₂CO₃ and 7.7 gms. NaHCO₃ per 100 gms. H₂O.

When using 140° F. as the temperature of crystallization, or the temperature at which the solution leaves the crystallizer, Fig. 1 of the earlier patent, would have a practical range of composition from about 27 gms. Na₂CO₃ and 9.5 gms. NaHCO₃ to 100 gms. H₂O, to about 36 gms. Na₂CO₃ and 5 gms. NaHCO₃ per 100 gms. H₂O, in turn corresponding to about 2.25 mols Na₂CO₃ per mol of NaHCO₃, and 5.7 mols Na₂CO₃ per mol NaHCO₃.

While a considerable variation is to be noted in the above figures, this constitutes no difficulty because a considerable range of composition is allowable while still maintaining congruent solution of the trona and recrystallization of sodium sesquicarbonate by cooling as the stable solid crystalline phase. Once having established a mother liquor of given composition at one point in the recirculation, as for example, the mother liquor used to dissolve the trona, my present invention leads to the maintenance of this composition preferably as a steady state with a maximum degree of economy.

In the process described, there are several points at which CO₂ is lost by decomposition of the sodium bicarbonate of the circulating brine, notably from the dissolver 10, the thickener 12, and from the discharge of each of the vacuum pumps 29. The recovery of CO₂ in the condensers 26 and 27, however, partially reduces this loss and reduces the amount of withdrawal necessary at 35 so that this withdrawn brine taken together with the brine which adheres to the crystals, which is also withdrawn because the crystals are not washed, can be balanced with the lost CO₂ with less discard than would be necessary if there were no recovery of CO₂ in the condensers 26 and 27. As I add trona and water to the cycle, I therefore keep the NaHCO₃ and Na₂CO₃ within the desired ratio without having to control the ratio by adding CO₂ from other sources to recarbonate the mother liquor or by adding calcined soda ash to the circulating brine. I have found that my discovery and application of this relationship leads to greater economy and ease of control in the operation of the process as compared with my earlier invention.

In what follows I shall set forth the approximate data concerned with producing 100,000 tons soda ash annually, and, on the assumption that half the evolution of CO₂ occurs in the crystallizers and that two-thirds of the CO₂ flashed off in the crystallizers is recovered in the condensers 26 and 27, I shall show the approximate loss of CO₂ which would occur if there was no recovery in the condensers 26 and 27. The exact amount of CO₂ recovered in the condensers cannot be accurately determined but it is known that the amount of CO₂ lost in my process is less than the amount of loss which theory would lead one to expect.

Example

A representative analysis of the Wyoming trona is as follows:

| Constituent | As Is | Calcined Basis |
|---|---|---|
| Na₂CO₃ | 45.21 | 94.92 |
| NaHCO₃ | 35.86 | |
| H₂O | 15.33 | |
| H₂O insoluble | 3.4 | 4.79 |
| Iron (Fe₂O₃) | .075 | .11 |
| NaCl | .0854 | .12 |
| Na₂SO₄ | .0356 | .05 |
| Na₂B₄O₇ | .004 | .005 |

The composition of the mother liquor used to dissolve the trona is preferably about as follows:

| Constituent | Percent | Lbs./100 Lbs. $H_2O$ |
|---|---|---|
| $NaHCO_3$ | 5.62 | 7.7 |
| $Na_2CO_3$ | 20.70 | 28.4 |
| NaCl | .54 | .735 |
| $Na_2SO_4$ | .21 | .306 |
| $H_2O$ | 72.91 | |

| | |
|---|---|
| Lbs. of trona treated per hour | 39,300 |
| Weight of dry crystals $Na_2CO_3 \cdot NaHCO_3 \cdot 2H_2O$ produced, lbs./hr. | 37,400 |
| Lbs./hr. recycled mother liquor: | |
| $NaHCO_3$ | 14,600 |
| $Na_2CO_3$ | 54,600 |
| NaCl | 1,400 |
| $Na_2SO_4$ | 570 |
| Water | 208,000 |
| Total, approximately | 278,000 |

| | With Partial Recovery of $CO_2$ in Condensers | Without Recovery of $CO_2$ in Condensers |
|---|---|---|
| Mols per hr. $CO_2$ lost | 2.68 | 4.02 |
| Lbs./hr. $CO_2$ lost | 118 | 177 |
| Lbs./hr. $Na_2CO_3$ in the brine withdrawn and with the crystals to give a trona analysis with the $NaHCO_3$ in the brine and with the lost $CO_2$ | 1,297 | 1,930 |
| $NaHCO_3$ in brine withdrawn and with crystals, lbs./hr | 351 | 517 |
| $H_2O$ withdrawn and with crystals, lbs./hr | 4,570 | 6,800 |
| Water with sodium sesquicarbonate crystals, lbs./hr. (this is a constant) | 3,930 | 3,930 |
| Water withdrawn, lbs./hr. (This is a variable to match the loss of $CO_2$. If the latter increases, the amount withdrawn also increases.) | 640 | 2,870 |

The amount of NaCl added with the trona is 33.6 lbs./hr. and as this must be removed with the water withdrawn and in the crystals, the concentration of NaCl, expressed as lbs. NaCl per 100 lbs. water, is $$\frac{33.6}{4570} \times 100 = .735$$

| | |
|---|---|
| Same concentration for $Na_2SO_4$ | .306 |
| NaCl in soda ash (this results from the NaCl in the mother liquor adhering to the crystals of sodium sesquicarbonate) percent | .111 |
| Same for $Na_2SO_4$ | .047 |
| Total material in brine adhering to unwashed crystals, lbs./hr.: | |
| $NaHCO_3$ | 303 |
| $Na_2CO_3$ | 1,115 |
| Equivalent sodium sesquicarbonate | 1,860 |
| Equivalent percentage of total produced | 5.0 |
| NaCl | 28.9 |
| $Na_2SO_4$ | 12.0 |
| $H_2O$ | 3,930 |

The circulating brine withdrawn contains the following lbs./hr.:

| | With Partial Recovery of $CO_2$ in Condensers | Without Recovery of $CO_2$ in Condensers |
|---|---|---|
| $NaHCO_3$ | 46 | 221 |
| $Na_2CO_3$ | 178 | 816 |
| Equivalent sodium sesquicarbonate | 295 | 1,360 |
| Percent of total produced | .79 | 3.6 |

(This loss is so small where $CO_2$ is partially recovered in the condensers that recovery by carbonation, as indicated in 38, is entirely optional.)

| | |
|---|---|
| Mol ratio, $Na_2CO_3/NaHCO_3$ | 1.035 |
| (This is a satisfactory ratio, comparing as it does with 1.00 in pure sodium sesquicarbonate.) | |
| Makeup water, lbs./hr. (including that withdrawn and with the crystals, plus about 2,000 lbs./hr. lost with the waste from filter 13 and with the adsorbent from filter 15) | 6,570 |
| Pure water returned to process from condenser 28, lbs./hr | 11,040 |
| Lbs. water per hr. which must be heated from about 165° to 212° F. (this is the amount entering the crystal settler 25, plus makeup plus water returned from condenser 28) | 208,000 |
| B. t. u./hr. to heat water | 9,780,000 |
| B. t. u./hr. to heat solids in solution | 810,000 |
| Total B. t. u./hr. | 10,590,000 |

To this must be added the fuel required to calcine the crystals of sodium sesquicarbonate or to dry them.

Summing up, in the practice of my process, when the loss of $CO_2$ is 118 lbs./hr., I withdraw sufficient of the circulating brine so that with the brine which adheres to the unwashed crystals, I have withdrawn the following lbs./hr.:

| | |
|---|---|
| $NaHCO_3$ | 303+46=349 |
| $Na_2CO_3$ | 1115+178=1293 |
| $H_2O$ | 3930+670=4570 |
| NaCl | 33.6 |
| $Na_2SO_4$ | 14.0 |

The 118 lbs./hr. $CO_2$ would react with $Na_2CO_3$ as follows:

$$Na_2CO_3 + CO_2 + H_2O \rightarrow 2NaHCO_3$$

and if this reaction were actually allowed to occur, it would use up about 284 lbs. $Na_2CO_3$, and make 451 lbs. $NaHCO_3$. This would give:

| | |
|---|---|
| $NaHCO_3$ | 800 |
| $Na_2CO_3$ | 1009 |

Weight ratio, $NaHCO_3/Na_2CO_3 = .79$.

This same ratio occurs in trona, which shows that I have virtually operated my process with depletion only of trona and water, together with the NaCl and $Na_2SO_4$ introduced with the trona, and that because I also introduce trona and water into the circulation, I therefore may operate the process continuously with substantially unvarying composition of the circulation, with minimum losses, maximum yield, and a product of the highest purity.

While I have described a preferred method of practicing my invention it will be understood that various modifications and changes may be made from that described without departing from the spirit of my invention or the scope of the appended claims.

I claim:

1. A process for the production of sodium sesquicarbonate from crude trona which comprises dissolving the trona in a circulating system open to the atmosphere at the point where the trona is dissolved, in a recirculating solution of a mother liquor of sodium carbonate and sodium bicarbonate in which the ratio of normal carbonate to bicarbonate is maintained so that the normal carbonate and the bicarbonate in the trona are dissolved in the ratio in which they exist in the trona at a temperature not substantially less than the boiling point of the recirculating solution, with consequent loss of $CO_2$ from the circulating system at the point where the trona is dissolved, crystallizing and separating sodium sesquicarbonate from said solution by cooling, and recovering a portion of the $CO_2$ lost in the crystallizers by passing it through a stream of cooled recirculating mother liquor and discharging the unabsorbed $CO_2$ to the atmosphere.

2. A process for the production of sodium sesquicarbonate from crude trona which comprises dissolving the trona in a circulating system open to the atmosphere at the point where the trona is dissolved, in a recirculating solution of a mother liquor of sodium carbonate and sodium bicarbonate in which the ratio of normal carbonate to bicarbonate is maintained so that the normal carbonate and the bicarbonate in the trona are dissolved in the ratio in which they exist in the trona at a temperature not substantially less than the boiling point of the recirculating solution, with consequent loss of $CO_2$ from the circulating system at the point where the trona is dissolved, crystallizing and separating sodium sesquicarbonate from the mother liquor by cooling, diluting the mother liquor with makeup water and recirculating the mother liquor, and recovering a portion of the $CO_2$ lost in the crystallizers by passing it through a stream of cooled recirculating mother liquor and discharging the unabsorbed $CO_2$ to the atmosphere.

3. The method of producing refined sodium sesquicarbonate from naturally occurring trona carrying insoluble material and coloring matter, which comprises dissolving the trona in a circulating system open to the atmosphere at the point of dissolution of the trona in a recycling brine of sodium carbonate and bicarbonate at a temperature of not substantially less than the boiling point of the recirculating solution with consequent loss of $CO_2$ from the recirculating solution, removing the insoluble material from said solution, contacting the solution with an adsorbent and removing the adsorbent and coloring matter from said solution, crystallizing and separating sodium sesquicarbonate by cooling, and recovering a portion of the $CO_2$ lost in the crystallizers by reacting it with the cooled recirculating mother liquor, discharging the unreacted $CO_2$ to the atmosphere and maintaining the ratio of concentrations of sodium carbonate and sodium bicarbonate in the recycling solution at the desired amount by withdrawing from the solution, including the solution remaining with the crystals of sodium sesquicarbonate, the stoichiometric amount corresponding to the net amount of $CO_2$ lost, and recycling the remaining solution to dissolve more trona.

4. The method of producing refined sodium sesquicarbonate from naturally occurring trona carrying insoluble material and coloring matter, which comprises dissolving the trona in a circulating system open to the atmosphere at the point where the trona is dissolved in a recycling brine of sodium carbonate and bicarbonate at a temperature of not substantially less than the boiling point of the recirculating solution with consequent loss of $CO_2$ from the recirculating solution, removing the insoluble material from said solution, contacting the solution with an adsorbent and removing the adsorbent and coloring matter from said solution, crystallizing and separating sodium sesquicarbonate by cooling, and recovering a portion of the $CO_2$ lost in the crystallizers by reacting said $CO_2$ with the cooled recirculating mother liquor by passing the $CO_2$ which is released in the crystallizers through direct contact spray condensers in which the condensing liquid is cooled recycling brine discharging from the circulating system the unreacted $CO_2$ passing through the spray condensers, and maintaining the ratio of concentrations of sodium carbonate and sodium bicarbonate in the recycling solution at the desired amount by periodically withdrawing from the solution, including the solution remaining with the crystals of sodium sesquicarbonate, the stoichiometric amount corresponding to the net amount of $CO_2$ lost, and recycling the remaining solution to dissolve more trona.

5. A process for the production of sodium sesquicarbonate from crude trona which comprises dissolving the trona in a circulating system open to the atmosphere at the point where the trona is dissolved, in a recirculating solution of a mother liquor of sodium carbonate and sodium bicarbonate containing a concentration of normal carbonate to bicarbonate between 1.7 and 12.6 mols of normal carbonate to 1 mol of bicarbonate, at a temperature not substantially less than the boiling point of the recirculating solution with consequent loss of $CO_2$ from the circulating system, crystallizing and separating sodium sesquicarbonate by cooling, recovering a portion of the $CO_2$ lost in the crystallizers by passing the $CO_2$ lost in the crystallizers through direct contact spray condensers in which the condensing liquid is cooled recirculating mother liquor, and reacting a portion of said $CO_2$ with the recirculating mother liquor to increase the sodium bicarbonate content of the recirculating mother liquor and maintaining the ratio of concentrations of sodium carbonate and sodium bicarbonate in the recycling solution at the desired amount by periodically withdrawing from the solution, including the solution remaining with the crystals of sodium sesquicarbonate, the stoichiometric amount corresponding to the net amount of $CO_2$ lost, and recycling the remaining solution to dissolve more trona.

6. A process for the production of sodium sesquicarbonate from crude trona which comprises dissolving the trona in a circulating system open to the atmosphere at the point where the trona is dissolved, in a recirculating solution of a mother liquor of sodium carbonate and sodium bicarbonate containing a concentration of normal carbonate to bicarbonate between 1.7 and 12.6 mols of normal carbonate to 1 mol of bicarbonate, at a temperature not substantially less than the boiling point of the recirculating solution with consequent loss of $CO_2$ from the circulating system, crystallizing and separating sodium sesquicarbonate from the mother liquor by cooling, diluting the mother liquor with makeup water and recirculating the mother liquor and recovering a portion of the $CO_2$ lost in the crystallizers by passing the $CO_2$ lost in the crystallizers through direct contact spray condensers in which the condensing liquid is cooled, diluted, recirculating mother liquor, reacting a portion of said $CO_2$ with the recirculating mother liquor to increase the sodium bicarbonate content of the recirculating mother liquor, discharging $CO_2$ unabsorbed in the recirculating liquor from the circulating system, and maintaining the ratio of concentrations of sodium carbonate and sodium bicarbonate in the recycling solution at the desired amount by withdrawing from the solution, including the solution remaining with the crystals of sodium sesquicarbonate, the stoichiometric amount corresponding to the net amount of $CO_2$ lost, and recycling the remaining solution to dissolve more trona.

7. A process for the production of sodium sesquicarbonate from crude trona which comprises dissolving the trona in a circulating system open to the atmosphere at the point where trona is dissolved in a recirculating solution of sodium carbonate and sodium bicarbonate at a temperature not substantially less than the boiling point of the recirculating solution with consequent substantial loss of $CO_2$ from the circulating system, said solution containing a greater concentration of the normal carbonate than of the bicarbonate but a concentration thereof at which sodium carbonate and sodium bicarbonate are dissolved in the solution in the ratio in which they exist in trona, crystallizing and separating sodium sesquicarbonate by cooling, maintaining the ratio of concentrations of sodium carbonate and sodium bicarbonate in the recirculating solution substantially constant by reacting a portion of the $CO_2$ lost from the circulating system with the cooled recirculating solution to increase the sodium bicarbonate content of said solution and by withdrawing from the circulation the stoichiometric amount of solution corresponding to the amount of unreacted $CO_2$ lost to restore the desired sodium carbonate to sodium bicarbonate concentration, and recirculating the remainder of said solution of sodium carbonate and sodium bicarbonate and dissolving more trona therein.

References Cited in the file of this patent

UNITED STATES PATENTS

| | | |
|---|---|---|
| 1,319,128 | Watson | Oct. 21, 1919 |
| 1,618,834 | Kuhnert | Feb. 22, 1927 |
| 2,346,140 | Pike | Apr. 11, 1940 |
| 2,414,607 | Phillips | Jan. 21, 1947 |
| 2,420,795 | Phillips | May 20, 1947 |
| 2,639,217 | Pike | May 19, 1953 |
| 2,656,245 | Gray et al. | Oct. 20, 1953 |